US012807231B2

(12) United States Patent
Jiang et al.

(10) Patent No.: US 12,807,231 B2
(45) Date of Patent: *Nov. 24, 2026

(54) CHASSIS ASSEMBLY AND VEHICLE

(71) Applicant: Eve Power Co., Ltd., Jingmen (CN)

(72) Inventors: Jibing Jiang, Jingmen (CN); Bohao Xu, Jingmen (CN); Yuhong Xu, Jingmen (CN); Yanyan Gu, Jingmen (CN); Guoxiang Zhang, Jingmen (CN); Zhongzhi Yuan, Jingmen (CN); Jincheng Liu, Jingmen (CN)

(73) Assignee: Eve Power Co., Ltd., Jingmen (CN)

( * ) Notice: Subject to any disclaimer, the term of this patent is extended or adjusted under 35 U.S.C. 154(b) by 458 days.

This patent is subject to a terminal disclaimer.

(21) Appl. No.: 18/542,794

(22) Filed: Dec. 18, 2023

(65) Prior Publication Data

US 2024/0116571 A1 Apr. 11, 2024

Related U.S. Application Data

(63) Continuation of application No. 17/425,973, filed as application No. PCT/CN2020/106925 on Aug. 5, 2020, now Pat. No. 11,891,119.

(30) Foreign Application Priority Data

May 27, 2020 (CN) ......................... 202010464225.8
May 27, 2020 (CN) ......................... 202020922703.0

(51) Int. Cl.

| | |
|---|---|
| ***B62D 21/02*** | (2006.01) |
| ***A62C 3/07*** | (2006.01) |
| ***B60L 3/00*** | (2019.01) |
| ***B60L 50/60*** | (2019.01) |
| ***B60L 50/64*** | (2019.01) |

(52) U.S. Cl.

CPC ................ *B62D 21/02* (2013.01); *A62C 3/07* (2013.01); *B60L 3/0046* (2013.01); *B60L 50/64* (2019.02); *B60L 50/66* (2019.02)

(58) Field of Classification Search

CPC ........ B60L 50/64; B60L 50/66; B60L 3/0046; B62D 21/02; A62C 3/07

USPC ......................................................... 180/68.5

See application file for complete search history.

(56) References Cited

U.S. PATENT DOCUMENTS

| | | | | |
|---|---|---|---|---|
| 8,210,301 | B2 * | 7/2012 | Hashimoto | B60K 1/04 180/68.5 |
| 9,027,684 | B2 * | 5/2015 | Araki | B60K 1/04 180/311 |
| 9,662,965 | B2 * | 5/2017 | Poillot | B60K 1/04 |
| 10,160,344 | B2 * | 12/2018 | Newman | H02J 7/751 |
| 10,207,574 | B2 * | 2/2019 | Ozawa | H01M 50/204 |
| 10,494,030 | B1 * | 12/2019 | Paramasivam | B60K 1/04 |
| 10,583,746 | B2 * | 3/2020 | Ogaki | H01M 10/625 |

(Continued)

*Primary Examiner* — James A Shriver, II

(57) ABSTRACT

The present disclosure provides a chassis assembly and a vehicle. The chassis component includes: a chassis provided with a plurality of mounting positions and configured to install a battery module; a quick-release device through which the battery module is installed on the mounting positions, wherein the quick-release device is controlled by a control system; and a voltage electrical connecting assembly electrically connected to the battery module, wherein the voltage electrical connecting assembly is controlled by the control system. The vehicle includes the chassis assembly.

20 Claims, 12 Drawing Sheets

(56) References Cited

U.S. PATENT DOCUMENTS

| | | | | |
|---|---|---|---|---|
| 11,180,253 | B1 * | 11/2021 | Seeley | B64U 60/50 |
| 11,891,119 | B2 * | 2/2024 | Jiang | H01M 50/249 |
| 2009/0013110 | A1 * | 1/2009 | Novotney | G11B 19/027<br>710/303 |
| 2010/0112843 | A1 * | 5/2010 | Heichal | H01M 50/249<br>439/299 |
| 2012/0043147 | A1 * | 2/2012 | Milner | B60L 50/64<br>180/68.5 |
| 2014/0165354 | A1 * | 6/2014 | Ojima | B60K 1/04<br>29/281.1 |
| 2015/0083509 | A1 * | 3/2015 | Borroni-Bird | B60W 10/08<br>180/204 |
| 2015/0151624 | A1 * | 6/2015 | Yamada | B60K 1/04<br>180/68.5 |
| 2016/0355100 | A1 * | 12/2016 | Ito | H01M 10/6568 |
| 2018/0237075 | A1 * | 8/2018 | Kawabe | B60L 50/66 |
| 2018/0272825 | A1 * | 9/2018 | Eagleton | B60P 3/0255 |
| 2019/0275875 | A1 * | 9/2019 | Fukui | B60K 1/04 |

* cited by examiner

CHASSIS ASSEMBLY AND VEHICLE

RELATED APPLICATIONS

This application is a continuation of U.S. patent Ser. No. 17/425,973 filed on Jul. 27, 2021, which is a National Phase of PCT Patent Application No. PCT/CN2020/106925 having International Filing Date of Aug. 5, 2020, which claims the benefit of priority of Chinese Patent Application Nos. 202020922703.0 and 202010464225.8, filed on May 27, 2020. The contents of the above applications are all incorporated by reference as if fully set forth herein in their entirety.

All of the afore-mentioned applications are hereby incorporated by reference in their entireties.

FIELD AND BACKGROUND OF THE INVENTION

The present disclosure relates to battery modules for electric vehicles, and in particular to a chassis assembly and a vehicle.

At present, most of the battery systems and electric vehicles on the market are in the echelon group form of battery cells—modules—battery packs-frame. The module levels are omitted during the grouping process of some vehicles, and the group form of battery cell—battery pack—frame is used. However, no matter which above-mentioned group form is used, since the battery pack level exists alone and is fixedly connected to the frame, the electric vehicle in the group form has the following defects and deficiencies.

Firstly, before the vehicle battery system is repaired, the battery pack must be removed from the frame and then internally disassembled. The repair process is complicated. Secondly, when a vehicle collides during traveling, in addition to the stress generated from the deformation of the frame applied upon the modules or battery cells, the squeeze applied by the frame upon the battery packs and the deformation of the battery packs itself will also cause secondary damage to the modules or battery cells. For example, in a condition that an electric vehicle with a large amount of electricity needs to be deployed, the damage to the entire vehicle caused by side collisions and side pillar collisions will increase significantly.

SUMMARY OF INVENTION

The present disclosure provides a chassis assembly and a vehicle. The problem of quick disassembly, assembly and maintenance of a single module and the problem of damage to the battery module during a vehicle collision will be handled.

In some embodiments, the present disclosure provides a chassis assembly, comprising:

- a chassis provided with multiple mounting positions, and which is configured to install a battery module;
- a quick-release device through which the battery module is installed on the mounting positions, wherein the quick-release device is controlled by a control system; and
- a voltage electrical connecting assembly in quick plug-in electrical connection to the battery module, wherein the voltage electrical connecting assembly is controlled by the control system.

In some embodiments, the present disclosure provides a vehicle, comprising the chassis assembly as mentioned above.

Figure 1:
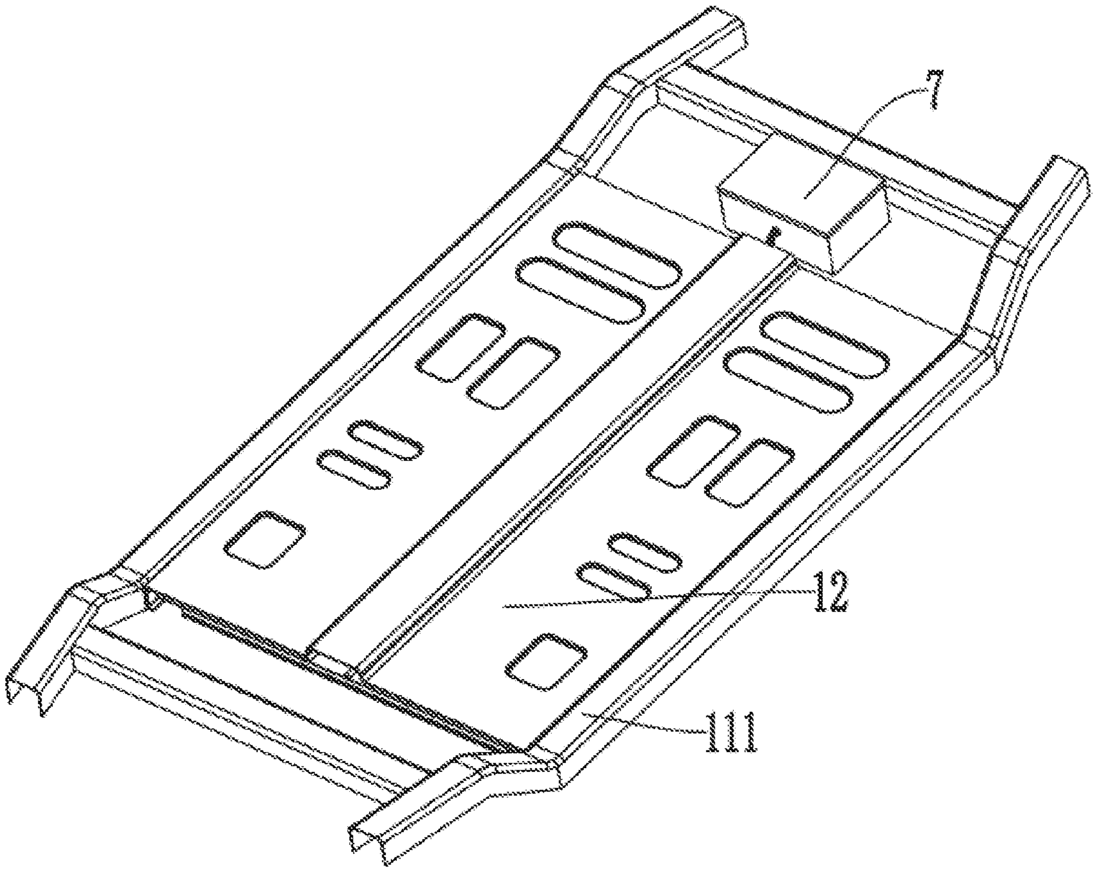
FIG. 1 is a schematic diagram showing the first structure of a chassis assembly provided by the present disclosure.
Figure 2:
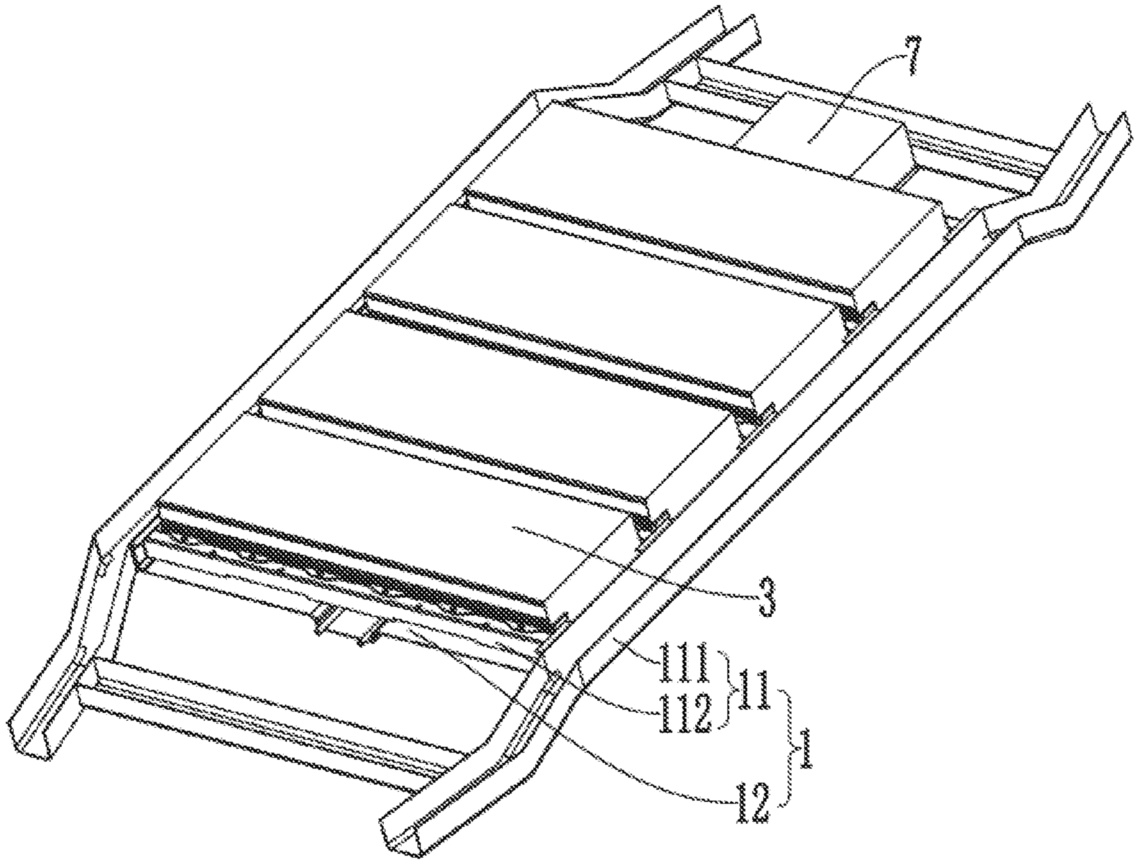
FIG. 2 is a schematic diagram showing the second structure of a chassis assembly provided by the present disclosure.
Figure 3:
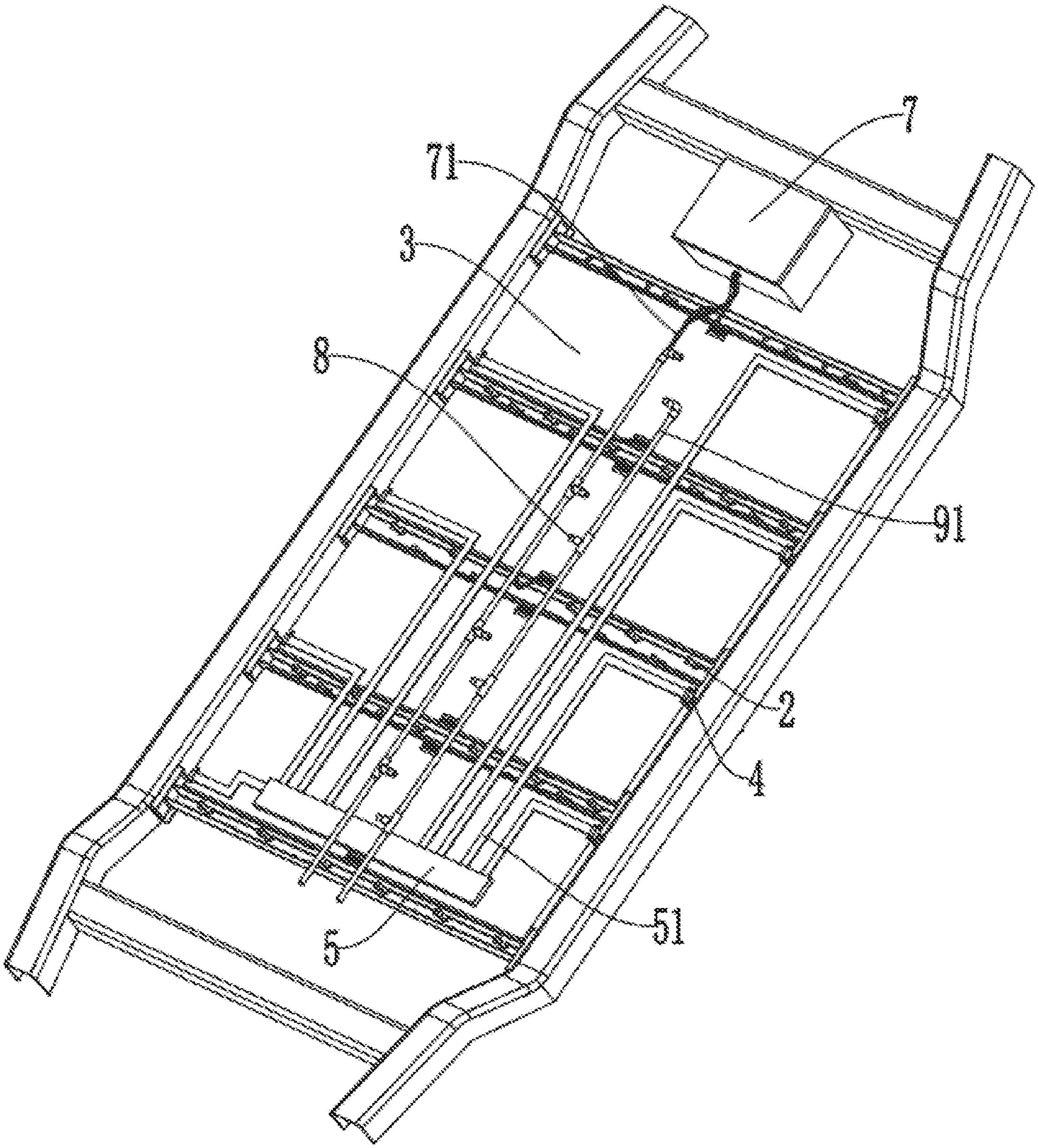
FIG. 3 is a schematic diagram showing the first partial structure of a chassis assembly provided by the present disclosure.
Figure 4:
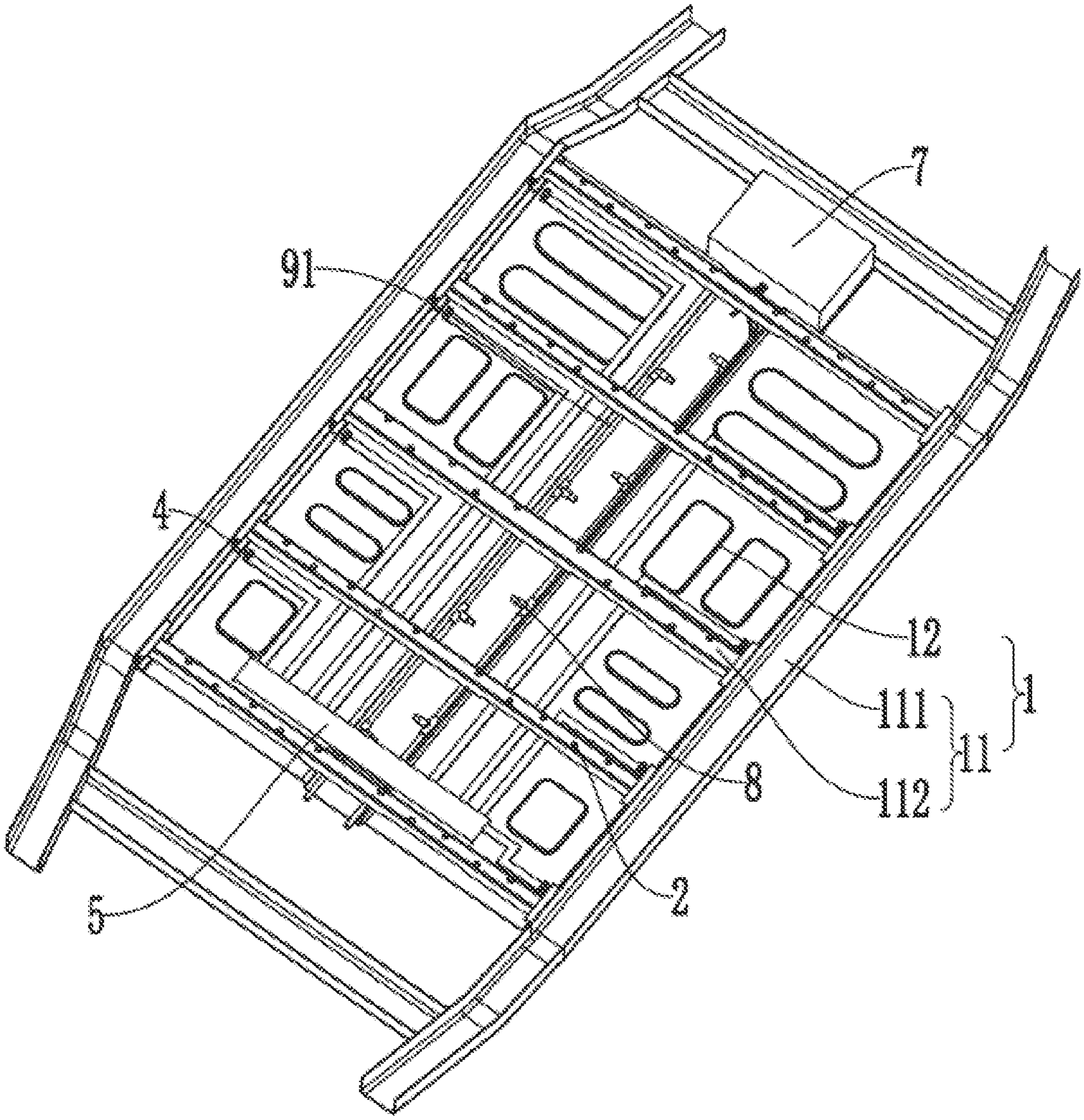
FIG. 4 is a schematic diagram showing the second partial structure of a chassis assembly provided by the present disclosure.
Figure 5:
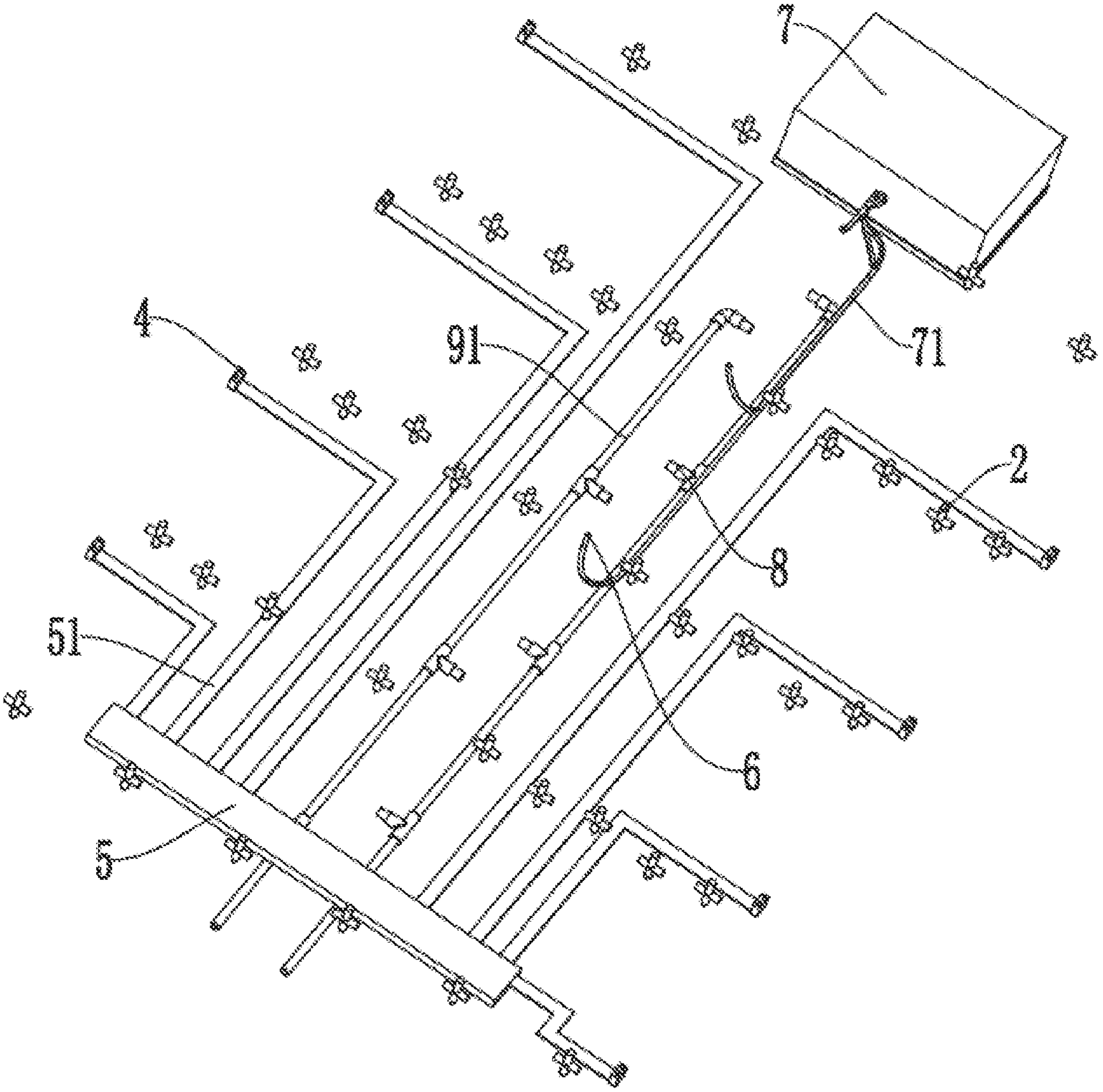
FIG. 5 is a schematic diagram showing the third partial structure of a chassis assembly provided by the present disclosure.
Figure 6:
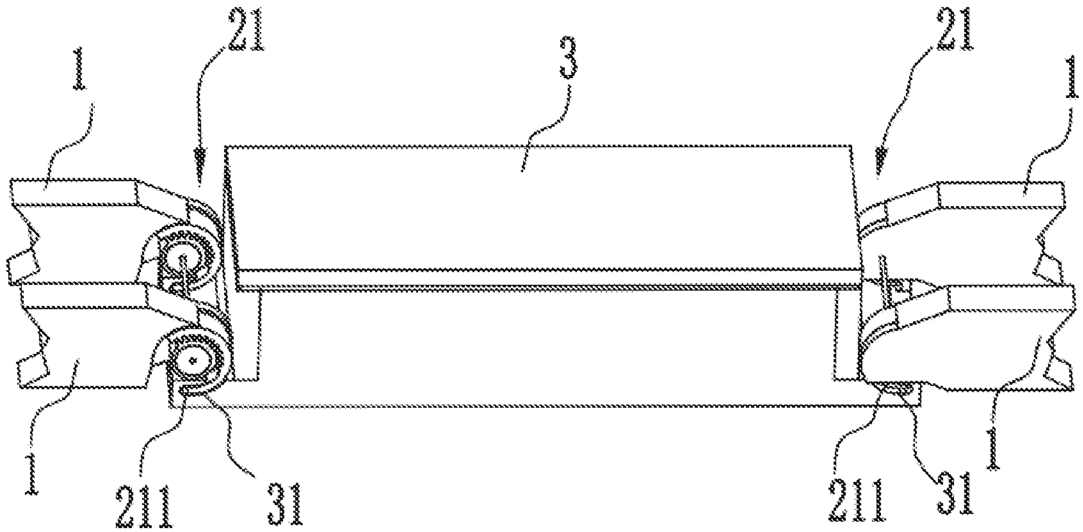
FIG. 6 is a schematic diagram showing the structure of a quick-release device provided by the present disclosure.

In the figures, 1: chassis 1, 11: base frame, 111: frame longitudinal beam, 112: frame transverse member, 113: mounting base, 12: underbody floor;

- 2: quick-release device, 21: rotating assembly, 211: rotating hook 211, 2111: tooth groove 2111, 212: rotating shaft, 2121: tooth, 2122: first connecting platform, 213: linkage shaft;
- 3: battery module, 31: hook groove, 32: bump, 33: connecting flange;
- 4: first quick plug-in connector, 41: inserting post; 411: cavity, 412: through-hole, 413: oil delivery channel, 42: elastic seal, 43: steel ball, 44: limiting flange;
- 5: high-voltage electrical connecting assembly, 51: high-voltage cable, 6: second quick plug-in connector, 7: low-voltage electrical connecting assembly, 71: low-voltage cable, 8: third quick plug-in connector, 91: thermal management-controlling water pipe.

DESCRIPTION OF SPECIFIC EMBODIMENTS OF THE INVENTION

It should be noted that similar reference numerals and letters indicate similar items in the following drawings. Therefore, once a certain item is defined in a drawing, it does not need to be further defined and explained in the subsequent drawings.

It should be noted that the directions or positional relationships indicated by the terms “upper”, “lower”, “left”, “right”, “vertical”, “horizontal”, “inner”, “outer”, and the like show the orientation or positional relationship based on the drawings or the orientation or positional relationship usually placed in a condition that the product provided by the present disclosure is used. It is only for the convenience of describing the disclosure and simplifying the description. It does not indicate or imply that the device or component referred to must have a specific orientation or must be constructed and operated in a specific orientation. Therefore, it cannot be understood as a limitation of the present disclosure. Furthermore, the terms "first", "second", "third" and the like used solely for distinguishing the description, but are not to be construed as indicating or implying relative importance. In the description of the present disclosure, unless otherwise specified, the meaning of "a plurality" and "multiple" is two or more.

In the description of the present disclosure, unless otherwise specifically defined and limited, the terms "arranged" and "connected" are to be understood broadly, for example, it may be a fixed connection, a detachable connection, or an integration, and it may be a mechanical connection or an electrical connection. The specific meaning of the above terms in the present disclosure can be understood based on a specific case by those skilled in the art.

In the present disclosure, unless otherwise specifically specified and defined, the first feature being "on" or "under" the second feature may include direct contact of the first feature and second feature, and may also include a case where the first feature is not directly contacted with the second feature, but is contacted with the second feature through additional features between them. Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

Embodiments of the present application are described in detail below, examples of which are illustrated in the accompanying drawings, wherein the same or similar reference numerals indicate the same or similar elements or elements with the same or similar functions. The embodiments described below with reference to the drawings are exemplary only and are not to be construed as limiting the present disclosure.

As shown in FIGS. 1,2,3,4 and 5, the embodiment disclosures a chassis assembly included a chassis 1, a quick-release device 2, a battery module 3, a voltage electrical connecting assembly, a thermal management module, a third quick plug-in connector 8 and a control system.

Multiple mounting positions are disposed on the chassis. For example, the chassis includes a base frame 11, wherein the base frame 11 includes at least two frame longitudinal beams 111 arranged in parallel and at intervals and at least two frame transverse members 112 perpendicularly to arranged to the frame longitudinal beams 111. The frame transverse members 112 are fixed onto the frame longitudinal beams. Optionally, there are two frame longitudinal beams 111 in one embodiment, and the two frame longitudinal beams 111 are arranged at intervals. Both ends of each of the frame transverse members 112 are respectively fixed onto the two frame longitudinal beams 111. Mounting positions are formed between adjacent two of the frame transverse members 112 and a row of the mounting positions is formed on the base frame 11.

In other embodiments, it is also possible that three frame longitudinal beams 111 are arranged at intervals in sequence. Each of the frame transverse members 112 is arranged between adjacent two of the frame longitudinal beams 111, and both ends of each of the frame transverse members 112 are respectively fixed onto adjacent two of the frame longitudinal beams 111. Mounting positions are formed between adjacent two of the frame transverse members 112 and two rows of the mounting positions are formed on the base frame 11.

The above-mentioned mounting positions are formed between adjacent two of the frame transverse members 112. That is, every mounting position is a rectangular area surrounded by two adjacent frame longitudinal beams 111 and two adjacent frame transverse members 112. The shape of each of the battery module 3 matches the mounting position, which means the plane cross-sectional shape of the battery module 3 is rectangular and each of the mounting positions is provided with a battery module 3. In other embodiments, the number of battery module 3 and the mounting position to be installed can also be selected according to actual needs, and the number of the frame transverse members 112 and the frame longitudinal beams 111 will not be further limited here.

A battery module 3 is fixed onto the mounting position of the base frame 11 by a quick-release device 2. Four corners, or any two opposite sides, or four sides of the battery module 3 are fixed onto the base frame 11 through the quick-release device 2. For example, two long side surfaces of the battery module 3 are respectively fixed onto the frame transverse members 112 on both sides of the battery module 3 through a plurality of quick-release devices 2.

The quick-release device 2 is electrically connected to the control system, and the quick-release device 2 is controlled by the control system to release the fixation of the battery module 3, so that the battery module 3 can fall off from the base frame 11. Since the method of the control system for controlling the quick-release device 2 is a known art, it is not repeated herein.

The voltage electrical connecting assembly electrically connected to the battery module is controlled by the control system. The voltage electrical connecting assembly includes a high-voltage electrical connecting assembly and a low-voltage electrical connecting assembly.

The high-voltage electrical connecting assembly is in quick plug-in electrical connection to the battery module 3. The high-voltage electrical connecting assembly is electrically connected to the control system and controlled by the control system to be released and fall off from the battery module 3. The high-voltage electrical connecting assembly includes a first quick plug-in connector 4 and a high-voltage electrical connecting module 5. The high-voltage electrical connecting module 5 is connected to the battery module 3 through the first quick plug-in connector 4. For example, the high-voltage connecting module 5 is provided with a plurality of high-voltage cables 51, wherein the number of the high-voltage cables 51 is not less than the number of the battery modules 3. In a condition that the number of the high-voltage cables 51 is more than the number of the battery modules 3, the rest high-voltage cables 51 are reserved as spares. The end of the high-voltage cables 51 away from the high-voltage electrical connecting module 5 is connected to the first quick plug-in connector 4, and the first quick plug-in connector 4 is plugged into a high-voltage interface of the battery module 3. The first quick plug-in connector 4 which can allow high-voltage electricity to pass is an electrical quick plug-in connector. The first quick plug-in connector 4 is electrically connected to the control system, and the control system can control the first quick plug-in connector 4 to fall off from the battery module 3. Since the method of the control system for controlling the first quick plug-in connector 4 is a known art, itis not repeated herein.

The low-voltage electrical connecting assembly is in quick plug-in electrical connection to the battery module 3. The low-voltage electrical connecting assembly is electrically connected to the control system, and the low-voltage electrical connecting assembly is controlled by the control system to release and fall off from the battery module 3. The low-voltage electrical connecting assembly includes a second quick plug-in connector 6 and a low-voltage electrical connecting module 7. The low-voltage electrical connecting module 7 is installed on the base frame 11 and located on one end of the base frame 11. The low-voltage electrical connecting module 7 is connected to the battery module 3 through the second quick plug-in connector 6. For example, the low-voltage connecting module 7 is provided with a plurality of low-voltage cables 71, wherein the number of the low-voltage cables 71 is not less than the number of the battery modules 3. In a condition that the number of the low-voltage cables 71 is more than the number of the battery modules 3, the rest low-voltage cables 71 are reserved as spares. The end of the low-voltage cables 71 away from the low-voltage electrical connecting module 7 is connected to the second quick plug-in connector 6, and the second quick plug-in connector 6 is plugged into a low-voltage interface of the battery module 3. The second quick plug-in connector 6 which can allow low-voltage electricity to pass is an electrical quick plug-in connector. The second quick plug-in connector 6 is electrically connected to the control system, and the control system can control the second quick plug-in connector 6 to fall off from the battery module 3. Since the method of the control system for controlling the second quick plug-in connector 6 is a known art, it is repeated herein.

The thermal management module is electrically connected to the battery module 3 through the third quick plug-in connector 8. Two thermal management-controlling water pipes 91 for circulating cooling medium are arranged onto the thermal management module. Multiple third quick plug-in connectors 8 are disposed on the thermal management-controlling water pipes 91. The third quick plug-in connectors 8 are plugged into thermal management interfaces on the battery module 3. The thermal management module provides the cooling medium to the battery module 3 through one of the thermal management-controlling water pipes 91 to cool down the battery module 3. The cooling medium returns to the thermal management module through another thermal management-controlling water pipe 91 after cooling down the battery module 3. The third quick plug-in connectors 8 are a kind of quick-in connector for water pipes, which can allow the cooling medium to pass. The third quick plug-in connector 8 is electrically connected to the control system, and the control system can control the third quick plug-in connector 8 to fall off from the battery module 3. Since the method of the control system for controlling the third quick plug-in connector 8 is a known art, it is not repeated herein.

The control system is fixed onto the chassis 1 to provide control support for the chassis assembly. The control system includes a battery management system (BMS), a battery distribution unit (BDU), and a high-voltage power distribution unit (PDU), and other control components. The control system is connected to the after-sales service platform to reduce the number of transfers and improve energy efficiency. The signal is sent to the after-sales service platform mainly to facilitate the after-sales platform to monitor the status of the battery module 3.

Optionally, the chassis 1 further includes an underbody floor 12 fixed onto the base frame 11. An upper part of the battery module 3 is covered by the underbody floor 12, and the high-voltage electrical connecting module 5 is arranged onto the underbody floor 12. In one embodiment, the high-voltage electrical connecting module 5 is located on the lower surface of the underbody floor 12, and in other embodiments, the high-voltage electrical connecting module 5 can be located on the upper surface of the underbody floor 12. The low-voltage cables 71, the high-voltage cables 51 and the thermal management-controlling water pipes 91 are located on the lower surface of the underbody floor 12, and in other embodiments, they may also be located on the upper surface of the underbody floor 12.

The battery module 3 includes a cooling plate, a battery cell, a side-fixing plate, an edge-fixing plate, and a high-voltage copper bar. Moreover, the battery module 3 is sealed with IP67 and above, and the sealing performance is strong. In a normal running condition, the risk of battery liquid leakage can be effectively avoided. A temperature detecting component which may be a temperature sensor in one embodiment is arranged onto the battery module 3. The temperature detecting component is electrically connected to the control system. The electrical connecting mode and control method between the temperature detecting component and the control system are known art, which is not repeated herein. The temperature detecting component is configured to detect the temperature of the battery module 3 and transmits the detected information to the control system to monitor the temperature condition of the battery module 3.

Optionally, the chassis further includes a fire extinguishing device arranged on the base frame 11 and electrically connected to the control system. In a condition that a fire occurs in the battery module 3, the fire extinguishing device is controlled by the control system to extinguish the fire on the battery module 3 to prevent the fire from spreading.

In the event of an accident encountered by a vehicle, if the control system detects that the chassis 1 is about to be damaged through the collision sensor of the vehicle and the speed of the vehicle is too fast, the vehicle will be controlled to slow down to 30 kilometers an hour, then the control of the first quick plug-in connector 4, the second quick plug-in connector 6, the third quick plug connector 8, and the quick-release device 2 is initiated to depart the first quick plug-in connector 4, the second quick plug-in connector 6 and the third quick-plug connector 8 from the battery module 3, and the quick-release device 2 releases the fixation of the battery module 3 to disconnect the battery module 3 from the base frame 11, the low-voltage electrical connecting module 7, the high-voltage electrical connection module 5, and the thermal management module to avoid the damage to the battery module 3 due to the impending damage to the chassis 1.

In the event that a thermal runaway occurs in the vehicle during traveling or in a stationary parking state, if the control system detects the thermal runaway of the battery module 3 through the detecting component on the battery module 3, the control of the first quick plug-in connector 4, the second quick plug-in connector 6, the third quick plug connector 8 and the quick-release device 2 is initiated to depart the first quick plug-in connector 4, the second quick plug-in connector 6 and the third quick-plug connector 8 from the battery module 3, and the quick-release device 2 releases the fixation of the battery module 3 to disconnect the battery module 3 from the base frame 11, the low-voltage electrical connecting module 7, the high-voltage electrical connection module 5, and the thermal management module. The battery module 3 with thermal runaway which fixed onto the base frame 11 will be quickly detached to avoid damage to the entire vehicle caused by the impending thermal runaway spreading to all of the battery modules 3.

A bypass system and a high/low voltage system are provided in the vehicle. After the faulty battery module 3 falls off, the bypass system of the vehicle maintains the operation of the thermal management system and the high/low voltage system to maintain the operation of the remaining battery modules 3, and then integrally control the vehicle to travel by using the remaining battery module 3. The bypass system maintains the vehicle thermal management system and the high/low voltage system. Two problems are mainly solved. One is to maintain the remaining battery modules 3 to continuously operate; and the other is to ensure that after the faulty battery module 3 falls off, the series-parallel connections of the vehicle remain intact, without affecting the operation of the entire vehicle.

In an accidental condition of damaging the battery module 3 in the vehicle, the control system pre-judges the condition of the battery module 3, the driver is notified in advance to slow down and stop, and the after-sales platform guides the control system to remove the faulty battery module 3.

The arrangement of the battery module 3 on the chassis 1 solves the problem that the thermal runaway of a single battery module 3 damages the entire battery pack, and also solves the problem of quick disassembly and maintenance of the single battery module 3 and the problem of the damage and burning of the battery module 3 during a vehicle collision. Furthermore, the same group platform of the battery module 3 can be used to meet the power demand layout of different vehicles.

As an example, as shown in FIGS. 6 to 10, the quick-release device 2 includes a snap hook assembly and a rotating assembly 21. A mounting base 113 is arranged on the chassis 1. In one embodiment, the mounting base 113 may be arranged onto the frame transverse member 112, and may also be arranged onto the frame longitudinal beam 111 or on both.

The rotating assembly 21 includes a rotating hook 211 rotatably arranged onto the mounting base 113. The snap hook assembly includes a hook groove 31 defined by the battery module 3. The rotating hook 211 has a lock position and a release position. In a condition that the battery module 3 is in preset mounting position of the vehicles, the rotating hook 211 is rotated to the lock position and engages within the hook groove 31. In a condition that the rotating hook 211 is rotated to the release position, the rotating hook 211 is detached from the hook groove 31. The structure of the quick-release device 2 provided in this embodiment is simple. The battery module 3 is locked and fixed by the rotating hook 211 that engages within the hook groove 31 and is not released due to the shaking of the vehicle during operation. No more structures for restricting the position of the rotating hook 211 is needed because of the gravity of the battery module 3. The stability of the battery module 3 fixed onto the chassis 1 is improved, the operating time is shortened, and the time for locking the battery module 3 is reduced. The efficiency of disassembling and assembling the battery module 3 is improved.

Figure 7:
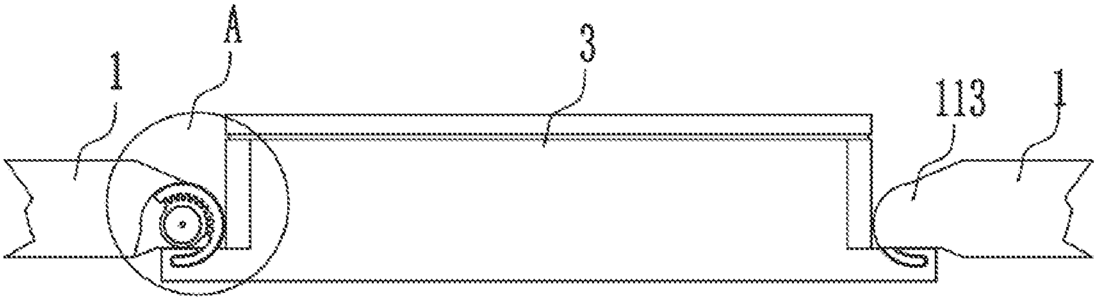
FIG. 7 is a schematic diagram showing the structure of a quick-release device with a rotating hook in lock position provided by the present disclosure.
Figure 10:
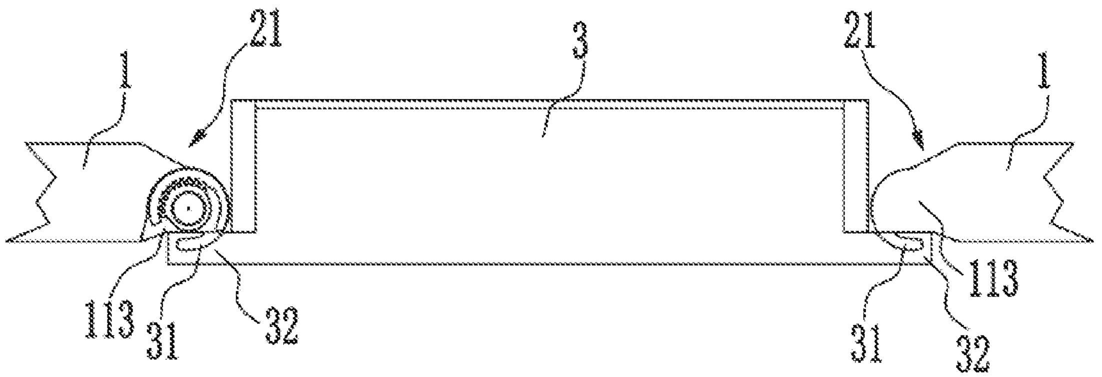
FIG. 10 is a schematic diagram showing the structure of a quick-release device with a rotating hook in release position provided by the present disclosure.
Figure 11:
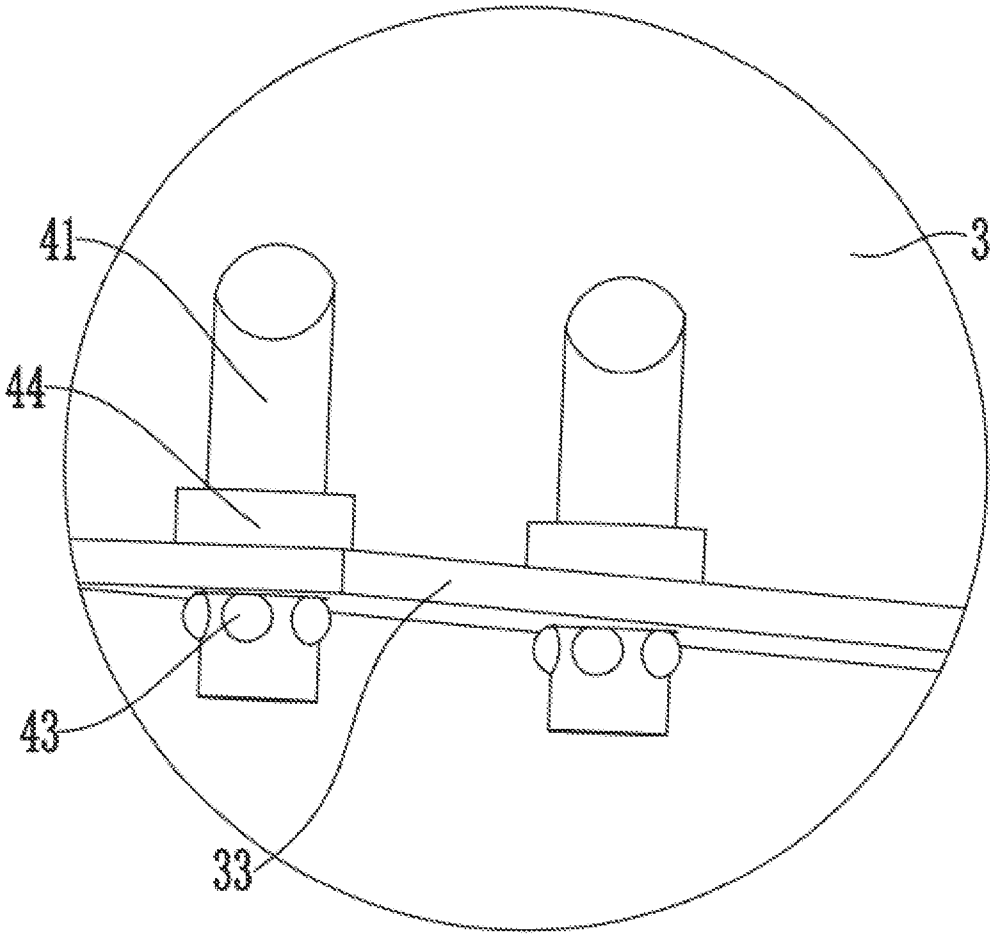
FIG. 11 is a partial structural diagram of a first quick plug-in connector inserted into a battery module provided in the present disclosure.

As an example, as shown in FIG. 7, in a condition that the battery module 3 is locked, the battery module 3 is in preset mounting position, the rotating hook 211 is rotated to the lock position to engage within the hook groove 31 to lock the battery module 3. As shown in FIG. 10, in a condition that the battery module is to be disassembled, the rotating hook 211 is rotated to the release position and is detached from the hook groove 31, the battery module 3 falls downward due to its own gravity, and the disassembly is automatically completed.

In this embodiment, the surface of the rotating hook 211 is coated with a damping material. In a condition that the battery module 3 is locked, the rotating hook 211 can be in interference fit within the hook groove 31, wherein the friction between the rotating hook 211 and the hook groove 31 is increased to improve the stability of the engaging therebetween. In a condition that the battery module 3 is removed, the rotating hook 211 is not prevented from coming out of the hook groove 31, and the practicability of the quick-release device 2 is improved.

In one embodiment, the two opposite sides of the battery module 3 are locked on the chassis 1. The chassis 1 is provided with a mounting base 113 on each of the two sides of the battery module 3. A rotating hook 211 is arranged on every mounting base 113.

In one embodiment, a hook groove 31 is defined by on each of the two opposite sides of the battery module 3. In a condition that the battery module 3 is on the preset mounting position of the vehicle, each of the rotating hooks 211 on the chassis engages within the hook groove 31 on the each of the two side of the battery module 3.

Optionally, at least two bumps 32 are respectively arranged on both sides of the battery module 3. Hook grooves 31 are disposed on the upper surface of the bumps 32, wherein the position and number of the rotating hooks 211 correspond to the position and number of the bumps 32. The provision of at least two bumps 32 can increase the number of connecting positions of the rotating hooks 211 and the battery module 3 and improve the stability of the battery module 3 after being fixed.

In one embodiment, two bumps 32 are respectively arranged on both sides of the battery module 3. A hook grooves 31 is disposed on each of the bumps 32.

In one embodiment, the hook grooves 31 extends to both sides of the bump 32 along the rotation axis direction of the rotating hooks 211 and are communicated with the two end surfaces of the bump 32, which increases contact area between the hook groove 31 and the rotating hook 211 and improves the stability of locking the battery module 3.

Figure 8:
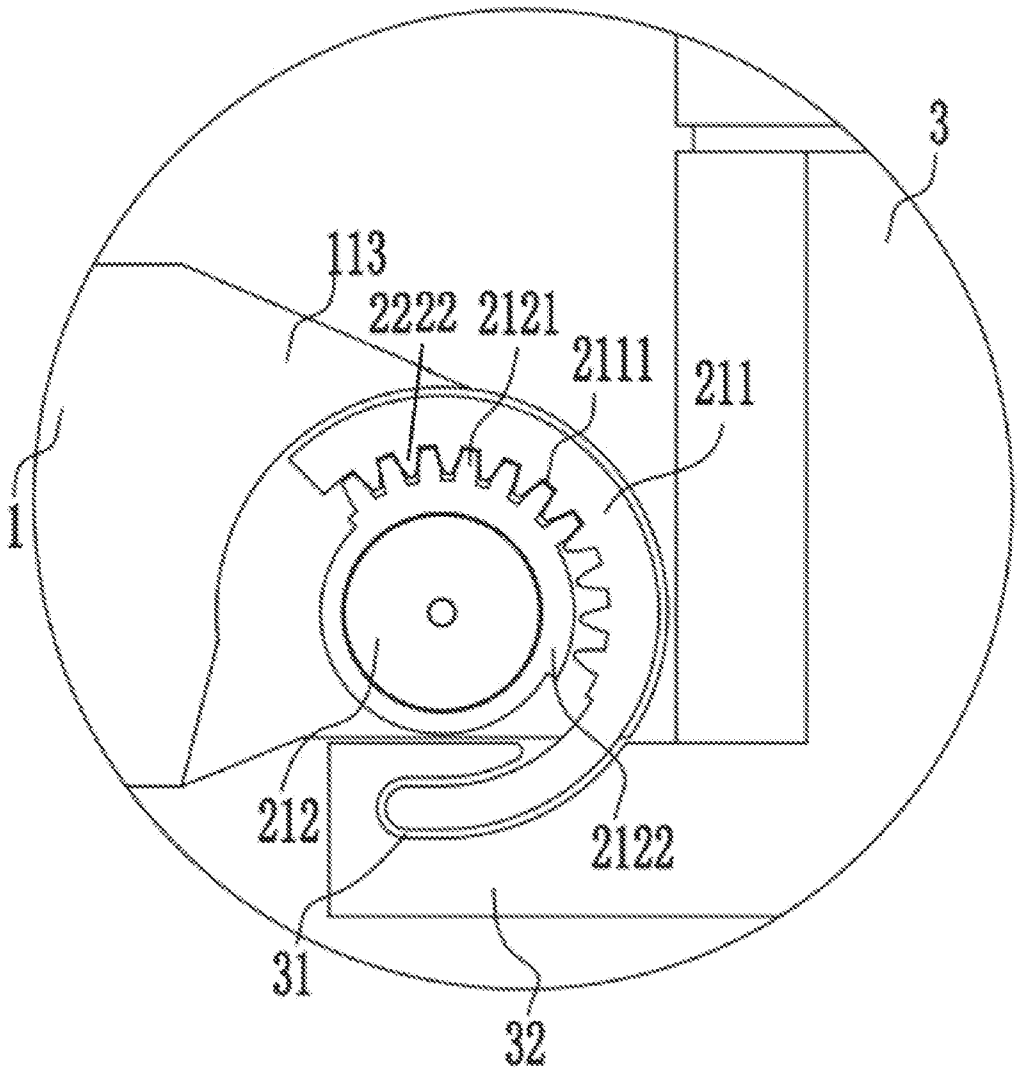
FIG. 8 is a partial enlarged view of part A in FIG. 7.

Optionally, as shown in FIG. 8, the rotating assembly 21 further includes a rotating shaft 212 which is configured to rotate to drive the rotating hook 211 to rotate. A first end of the rotating hook 211 is connected to a first end of the rotating shaft 212, and a second end of the rotating hook 211 is arranged in an arc shape and is configured to engage within the hook groove 31. A second end of the rotating shaft 212 is rotatably connected to one side of the mounting base 113.

In one embodiment, the rotating hook 211 is coaxial with the rotating shaft 212 and the rotating axis is arranged along the horizontal direction. A first connecting platform 2122 is convexly disposed on a circumferential surface of the rotating shaft 212 facing the rotating hook 211. The first end of the rotating hook 211 is fixed on the first connecting platform 2122, and the second end of the rotating hook 211 spaced from the rotating shaft 212 can engage within the hook groove 31. The first connecting platform 2122 is convexly disposed on the rotating shaft 212, and the first end of the rotating hook 211 is connected to the first connecting platform 2122, which facilitates the spaced arrangement of the second end of the rotating hook 211 and the rotating shaft 212 and the mounting of the second end of the rotating hook 211 engaging within the hook groove 31.

In one embodiment, the rotating hook 211 is provided in a circular arc shape. In order to ensure the stability of locking of the battery module 3, the cross-sectional shape of the hook groove 31 is a circular arc matching with the rotating hook 211. In order to ensure the strength of the rotating hook 211 and the stability of the locking, the axial width and radial thickness of the rotating hook 211 can be adjusted according to the weight of the battery module 3. The groove width of the hook groove 31 in the radial direction of the rotating hook 211 and the thickness of the hook groove 31 in the axial direction of the rotating hook 211 are also adjusted accordingly.

Optionally, a tooth groove 2111 is defined by the inner circumferential surface of the rotating hook 211 facing the rotating shaft 212. A tooth 2121 is arranged on the first connecting platform 2122, and the tooth 2121 is engaged within the tooth groove 2111. It is ensured that the rotating hook 211 can be driven to rotate synchronously in a condition that the rotating shaft 212 rotates, and the locking stability of the battery module 3 is improved.

In one embodiment, a second connecting platform 2222 is convexly disposed on a circumferential surface of the rotating hook 211 facing the rotating shaft 212. The second connecting platform 2222 is connected to the first connecting platform 2122 of the rotating shaft 212. A tooth groove 2111 is defined by the second connecting platform 2222 and the tooth 2121 on the first connecting platform 2122 is engaged within the tooth groove 2111.

Optionally, the rotating assembly 21 further includes a driving motor. The output shaft of the driving motor is connected to the rotating shaft 212 to control the rotating shaft 212 to automatically rotate. In a condition that locking or disassembling the battery module 3, the rotating hook 211 can automatically engage within or detach from the hook groove 31, which improves the automation degree and convenience of the quick-release device 2.

Figure 9:
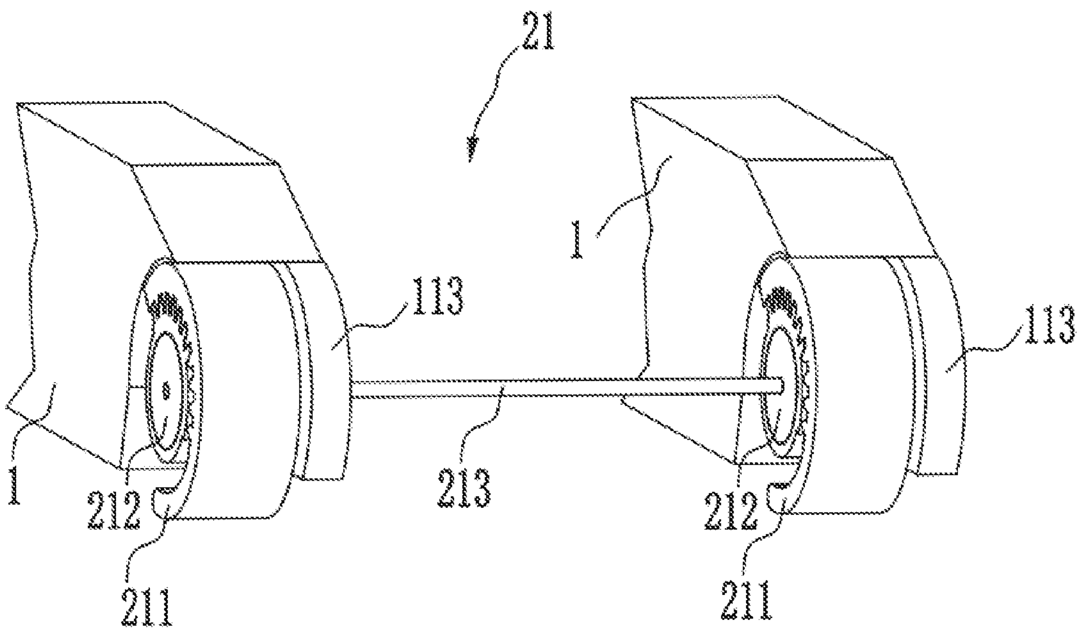
FIG. 9 is a schematic diagram showing the structure of a rotating assembly provided by the present disclosure.

Optionally, as shown in FIG. 9, the rotating assembly 21 further includes a linkage shaft 213. The two ends of the linkage shaft 213 are connected to the two adjacent rotating shafts 212 with coincident rotation axes, which can ensure the synchronous rotation of multiple rotating shafts 212 to improve the accuracy of locking the battery module 3. One driving motor can be used at the same time to drive at least two rotating shafts 212 to rotate synchronously, thereby the number of driving motors required and the cost are reduced. The driving motor is electrically connected to the control system, the control system controls the driving motor to drive the linkage shaft 213 to rotate, and then to drive the rotating shaft 212 to rotate to make the rotating hook 211 rotate.

In one embodiment, two rotating shafts 212 placed on the chassis 1 on the same side of the battery module 3 are coaxially arranged. Therefore, a linkage shaft 213 is connected between the two rotating shafts 212 on the same side of the battery module 3. One of the rotating shafts 212 is connected to the output shaft of the driving motor.

Optionally, the mounting base 113 is provided in a plate shape. A first end of the mounting base 113 is integrally connected to the chassis 1, and a second end in an arc shape is flush with the end of the rotating hook 211. The second end of the rotating shaft 212 is rotatably connected to one side of the mounting base 113. In a condition that the battery module 3 is locked in the preset mounting position of the vehicle, the lower surface of the mounting seat 113 is attached to the upper surface of the bump 32. In a condition that the mounting base 113 is in contact with the grooved surface of the battery module 3, it can be determined that the battery module 3 is in the lock position, which reduces the time for positioning the battery module 3 and improves the efficiency of disassembling and assembling the battery module 3.

In one embodiment, the groove width of the hook groove 31 in the radial direction of the rotating hook 211 is not less than the sum of the thickness of the rotating hook 211 and the plate-shaped mounting base 113.

In other embodiments, the size of the second end of the mounting base 113 should ensure that in a condition that the battery module 3 is moved to the rotating hook 211, and the movement of the battery module 3 is not affected. No further limitation is made herein.

The control system is configured to control the driving motor to drive the rotating hook 211 to rotate to a preset angle. In a condition that the battery module 3 in the preset mounting position on the chassis 1 needs to be locked and fixed, the control system is set to control the driving motor to drive the rotating hook 211 to rotate counterclockwise or clockwise to the lock position to make the rotating hook 211 to engage within the hook groove 31 to lock the battery module 3. In a condition that the battery module 3 needs to be disassembled, the control system is set to control the driving motor to drive the rotating hook 211 to rotate in the opposite direction to the release position to detach the rotating hook 211 from the hook groove 31, then the battery falls downward due to its own gravity, and the battery module 3 is completely disassembled. The setting of the control system improves the automation and convenience of the locking system.

In other embodiments, a pressure senor may also be arranged on the bottom surface of the mounting base 113. During the movement of the battery module 3 to the preset mounting position on the chassis 1, the bottom surface of the mounting base 113 is relatively close to the groove surface of the battery module 3 with the hook groove 31. In a condition that the pressure received by the pressure sensor exceeds the maximum preset pressure, the control system is also set to automatically start the driving motor to drive the rotating hook 211 to rotate to the lock position to engage the rotating hook 211 within the hook groove 31 to accomplish the locking of the battery module 3.

In other embodiments, the quick-release device 2 can also be another quick-release mechanism as long as the battery module 3 can be quickly installed on the mounting position, and the quick-release device 2 is controlled by the control system to quickly release the battery module 3 from the chassis 1. No other specific limitations are made herein.

As an example, and as shown in FIGS. 11, 12, 13 and 14, the battery module 3 is provided with a connecting flange, wherein the connecting flange is provided with an insertion hole.

The first quick plug-in connector 4 includes an inserting post 41, an expanded elastomeric assembly and a limiting flange 44. A first end of the inserting post 41 passes through the insertion hole, and a cavity 411 is defined by the inserting post 41. A through-hole 412 communicating with the cavity 411 is defined by an outer peripheral wall of the first end of the inserting post 41. The expanded elastomeric assembly is disposed in the through-hole. The expanded elastomeric assembly is configured to partially protrude from the outer peripheral wall of the inserting post 41 and pressing against a lower surface of the connecting flange 33. As an example, the expanded elastomeric assembly includes an elastic seal 42 and a steel ball 43. The elastic seal 42 seals and disposed in the through-hole 412 and located where the through-hole 412 is communicating with the cavity 411. The steel ball 31 is contained in the through-hole 412 and located outside the elastic seal 42. The steel ball can be completely located in the through-hole 412, or it can partially protrude from the outer peripheral wall of the inserting post 41 under the action of the elastic seal 42. The steel ball 43 is partially protruded from the outer peripheral wall of the inserting post 41 to press against the lower surface of the connecting flange 33 in a condition that the first quick plug-in connector 4 is inserted into the battery module 3. The limiting flange 44 is surrounding the outer peripheral wall of the inserting post 41, and a lower surface of the limiting flange 44 is pressed against an upper surface of the connecting flange 33. The steel ball 43 and the limiting flange 44 work together to fix the first quick plug-in connector 4 on the battery module 3.

Figure 12:
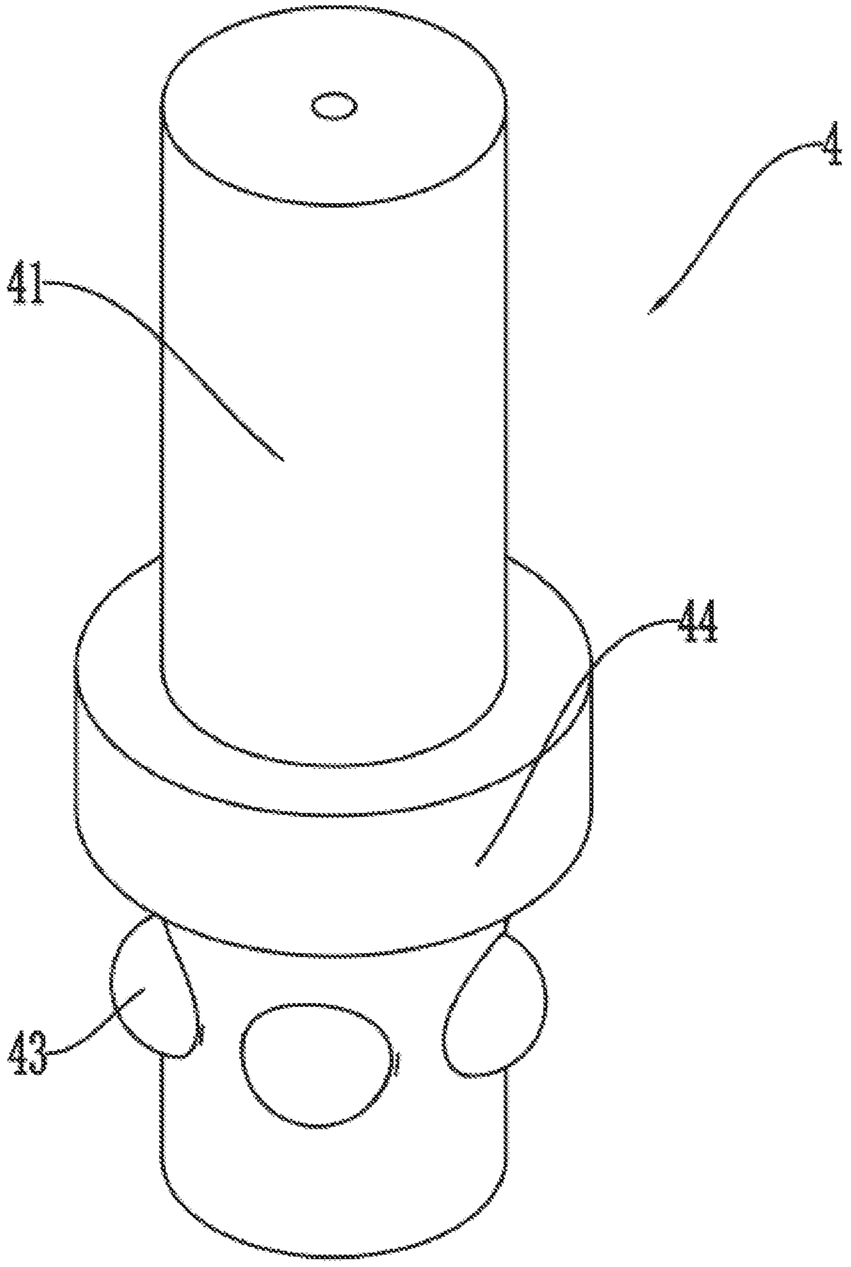
FIG. 12 is a schematic diagram showing the structure of a first quick plug-in connector provided by the present disclosure.
Figure 13:
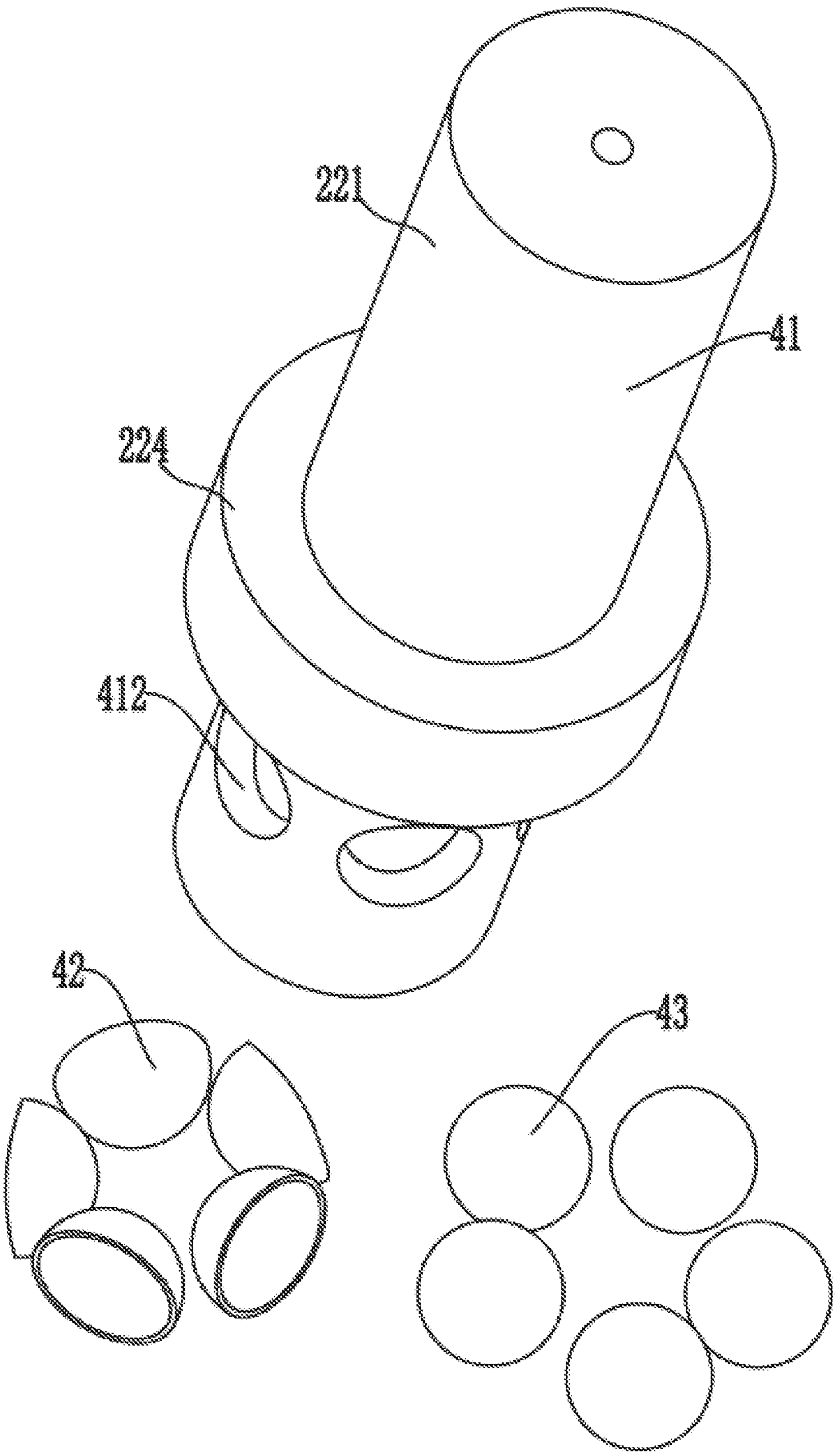
FIG. 13 is an exploded view of the structure of a first quick plug-in connector provided by the present disclosure.
Figure 14:
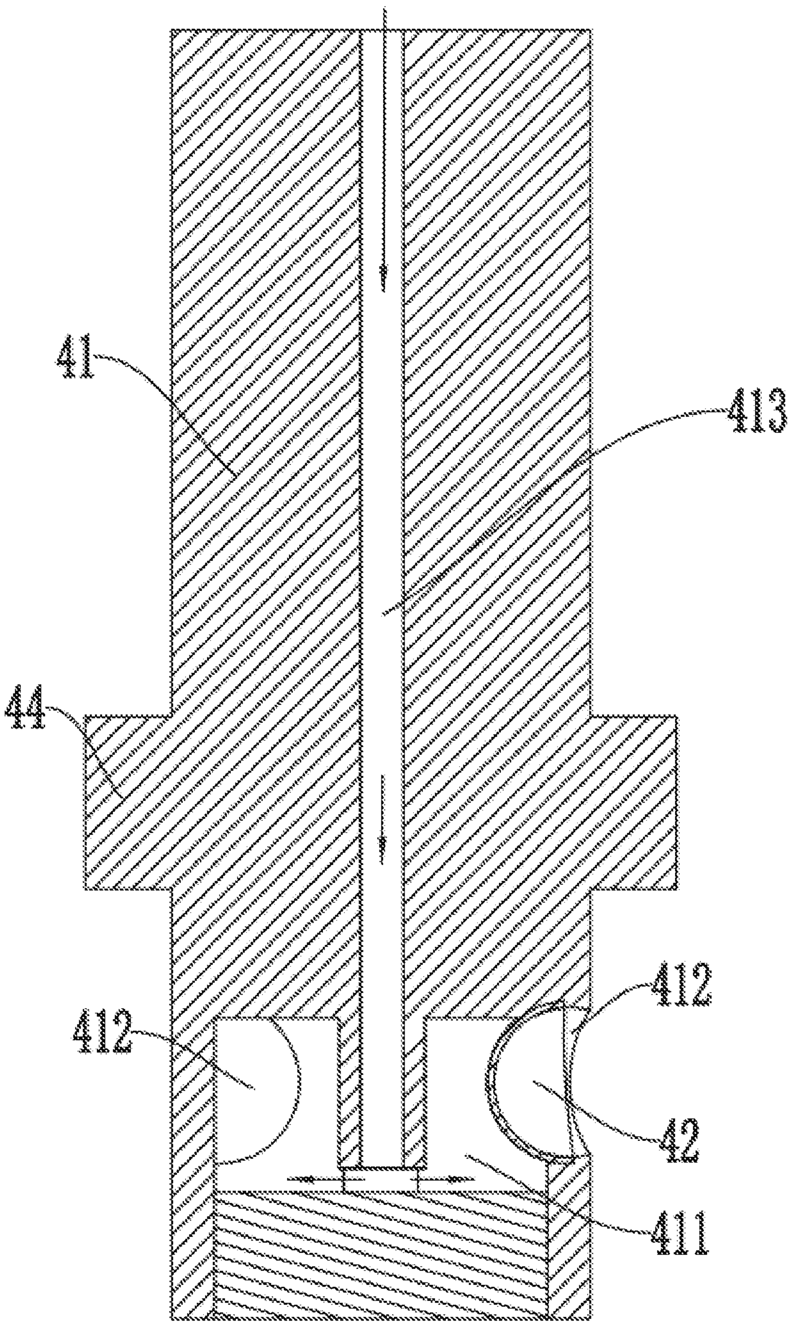
FIG. 14 is a cross-sectional view of a first quick plug-in connector provided by the present disclosure.

In one embodiment, as shown in FIGS. 12, 13 and 14, there are five expanded elastomeric assemblies. That is, there are five elastic seals 42 and five steel balls 43. In other embodiments, there may be one, two three, four or six or more expanded elastomeric assemblies. The limiting flange 44 is a ring-shaped structure. The limiting flange 44 which can be fixed by welding or integrally formed with the inserting post 41 is convexly arranged on the outer peripheral wall of the inserting post 41. In one embodiment, the limiting flange 44 and the inserting post 41 are integrally formed. Moreover, in order to enable the steel ball 43 to move in the corresponding through-hole 412 and partially extend out of the outer peripheral wall of the inserting post 41, the diameter of the steel ball 43 is larger than aperture of the unsealed end of the through-hole 412 without the elastic seal 42.

In order to ensure that the cavity 411 defined by the inserting post 41 is always in a sealed state to prevent the pressure in the cavity 411 from leaking through the through-hole 412, the elastic seal 42 is made of elastic rubber material, and the shape of the elastic seal 42 is approximately spherical housing. A housing opening end of the elastic seal 42 is fixed onto one end of the through-hole 412 communicating with the cavity 411 through interference fit.

An accommodating space for the steel ball 43 is formed between the housing opening of the elastic seal 42 and the through-hole 412. The steel ball 43 can be movably assembled in the accommodating space. Since the steel ball 43 cannot be swollen out of the through-hole 412, and the housing opening end of the elastic seal 42 always maintains an interference fit to be fixed on the end of the through-hole 412 which is communicated with the cavity 411, the pressure in the cavity 411 cannot escape through the through-hole 412.

An oil delivery channel 413 is provided on the inserting post 41 along the axial direction of the inserting post 41.

A shunt pipe (not shown in the figure) is connected to the top of the inserting post 41. The shunt pipe is connected to an oil pump. The oil pump and the shunt pipe can deliver hydraulic oil to oil delivery channel 413 and then deliver hydraulic oil into the cavity 411. Therefore, the pressure in the cavity 411 increases, the steel ball 43 is pushed to move outward by the elastic seal 42 to press against the lower surface of the connecting flange 33. Under the action of the hydraulic oil, the steel ball 43 will not move inward, so that the steel ball 43 can match the limit flange 44 to fix the first quick plug-in connector 4 on the connecting flange 33.

In a condition that the pressure of the hydraulic oil to the elastic seal 42 is cancelled, although the steel ball 43 can be attached to the lower surface of the connecting flange 33 under the elastic support of the elastic seal 42, the elastic seal 42 can elastically deform, and the support from the expansion pressure in the cavity 411 is lost. Therefore, in a condition that the end of the steel ball 43 protruding from the outer peripheral wall of the inserting post 41 receives the pressure from the lower surface of the connecting flange 33, the elastic seal 42 deforms, at the same time the steel ball 43 is retracted into the through-hole 412 and can no long generate a supporting force to the lower surface of the connecting flange 33. Then the battery module 3 automatically falls downward due to its own gravity, so that the battery module 3 can be quickly disassembled.

The oil pump is controlled by the control system to deliver hydraulic oil into the cavity 411, so that the pressure in the cavity 411 is increased. The steel ball 43 is pushed to move outward by the elastic seal 42 against the lower surface of the connecting flange 33.

In other embodiments, a high-pressure gas cylinder electrically connected to the control system can also deliver hydraulic oil into the cavity 411. High-pressure gas drives the elastic seal 42 to push the steel ball 43 to move outward, so that the steel ball 43 is pressed against the lower surface of the connecting flange 33. The principle and control circuit of hydraulic driving and air pressure driving are known technologies, are not described in detail.

As an example, in order to effectively maintain the expansion pressure in the cavities 411 of a plurality of inserting posts 41. In this embodiment, a two-position two-way electrically controlled valve (not shown in the figure) is further included. Wherein, the inlet of the two-position two-way electrically controlled valve is in communication with the outlet of the oil pump, and the outlet of the two-position two-way electrically controlled valve is in communication with the inlet of the shunt pipe. In a condition that it is necessary to deliver high-pressure hydraulic oil to the plurality of cavities 411 for expansion and tightening, the two-position two-way electrically controlled valve is in the open state at first, and then remains open for a preset time, such as 3-5 seconds. In a condition that the high-pressure oil is pumped into the plurality of cavities 411 by the oil pump, the steel ball 43 is pressed against the hole wall of the end of the through-hole 412 without the elastic seal 42 and cannot move. The two-position two-way electrically controlled valve is automatically closed upon the time to close, thereby locking the pressure in the plurality of cavities 411 to maintain the pressure. Currently, the oil pump also stops working, and the locking of the battery module 3 to the chassis 1 through the first quick plug-in connector 4 is accomplished. In a condition that it necessary to relieve the pressure to dismount the battery module 3, the two-position two-way electrically controlled valve is opened and the oil pump is not working. At this time, the pressure in the plurality of cavities 411 can be relieved along the path of the shunt pipe, the oil pump, and the oil tank. In a condition that the pressure is relieved, the first quick plug-in connector 4 is no longer tightly connected to the battery module 3, and the battery module 3 is automatically falls downward due to its own gravity to accomplish the disassembly work.

In one embodiment, the above-mentioned first quick plug-in connector 4 is only an exemplary structure. In other embodiments, the first quick plug-in connector 4 may also be another quick plug-in structure, as long as it can withstand high-voltage current and can be quickly detached from the battery module 3 under the control of the control system. Other specific and limited details are not repeated herein.

The structure of the second quick plug-in connector 6 can be similar to the first quick plug-in connector 4, or other quick plug-in structures, as long as it can withstand low-voltage current and can quickly detach from the battery module 3 under the control of the control system. Other specific and limited details are not repeated here.

This embodiment also discloses a vehicle which includes the aforementioned chassis assembly. The battery module 3 on the chassis assembly provides electrical energy for the operation of the vehicle.

The beneficial effects of this disclosure: in the event of an accident encountered by the vehicle, if the control system detects that the chassis 1 is about to be damaged through the collision sensor of the vehicle and the speed of the vehicle is too fast, the vehicle will be controlled to slow down to 30 kilometers an hour, then the control of voltage electrical connecting assembly and quick-release device 2 is initiated to depart the voltage electrical connecting assembly from the battery module 3, the quick-release device 2 releases the fixation of the battery module 3 to disconnect the battery module 3 from the chassis 1 and the voltage electrical connecting assembly. And then the battery module 3 falls off to avoid the damage to the battery module 3 due to the impending damage to the chassis 1. The battery module 3 is installed on the mounting position through the quick-release device 2. In a condition that the battery module 3 needs to be replaced or repaired, only the corresponding module can be removed but not necessary to disassemble the entire battery pack.

The arrangement of the battery module 3 on the chassis 1 solves the problem that the thermal runaway of a single battery module 3 will damage the entire battery pack. It also solves the problem of quick disassembly and maintenance of the single battery module 3 and the damage and ignition of the battery module 3 in a condition that the vehicle is in a collision process. Furthermore, the same group platform of the battery module 3 can be used to arrange the power demand of different vehicles.

Since the battery module 3 is directly arranged on the chassis 1, there will be more space for the arrangement of frame transverse member 112, the frame longitudinal beam 111 and protective structure. It will significantly increase the collision energy absorption area and improve the stress or strain of the battery module or battery cell after a collision.

Furthermore, in the event that a thermal runaway occurs in the vehicle during traveling or in a stationary parking state, if the control system detects the thermal runaway of the battery module 3 through the detecting component on the battery module 3, the control of the first quick plug-in connector 4, the second quick plug-in connector 6, the third quick plug connector 8 and the quick-release device 2 is initiated to depart the first quick plug-in connector 4, the second quick plug-in connector 6 and the third quick-plug connector 8 from the battery module 3, and the quick-release device 2 releases the fixation of the battery module 3 to disconnect the battery module 3 from the base frame 11, the low-voltage electrical connecting module 7, the high-voltage electrical connection module 5, and the thermal management module. The battery module 3 with thermal runaway which fixed on the base frame 11 will be quickly detached to avoid damage to the entire vehicle caused by the impending thermal runaway spreading to all the battery modules 3.

In an accidental condition of damaging the battery module 3 in the vehicle, the control system pre-judges the condition of the battery modules 3 the driver is notified in advance to slow down and stop, and the after-sales platform guides the control system to remove the faulty battery module.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety

What is claimed is:

1. A chassis assembly of a vehicle, comprising: a chassis with multiple mounting positions, and is configured to install a battery module; a quick-release device through which the battery module is installed on the multiple mounting positions, wherein the quick-release device is controlled by a control system; and a voltage electrical connecting assembly in quick plug-in electrical connection to the battery module, wherein the voltage electrical connecting assembly is controlled by the control system, wherein the quick-release device comprises: a rotating assembly including a rotating hook rotatably disposed on the chassis, wherein the rotating hook has a lock position and a release position; and a snap hook assembly including a hook groove disposed on the battery module; wherein the rotating hook is configured to engage within the hook groove in a condition that the battery module is in one of the multiple mounting positions on the chassis and the rotating hook is rotated to the lock position, and the rotating hook is configured to separate from the hook groove in a condition that the battery module is in one of the multiple mounting positions on the chassis and the rotating hook is rotated to the release position.

2. The chassis assembly of claim 1, wherein the battery module comprises a temperature detection component, the temperature detection component is electrically connected to the control system, the temperature detection component is configured to detect the temperature of the battery module and transmit the detected temperature information to the control system.

3. The chassis assembly of claim 1, wherein the surface of the rotating hook is coated with a damping material.

4. The chassis assembly of claim 1, wherein at least two bumps are respectively arranged on both sides of the battery module, wherein the rotating hook corresponds to the bump, and a hook groove is disposed on the upper surface of the bumps, wherein the hook grooves extend to both sides of the bump along a rotation axis direction of the rotating hooks and are communicated with the two end surfaces of the bump.

5. The chassis assembly of claim 1, wherein a mounting base is configured on the chassis, the rotating assembly further comprises a rotating shaft, the rotating shaft is configured to rotate to drive the rotating hook to rotate, wherein a first end of the rotating hook is connected to a first end of the rotating shaft, and a second end of the rotating hook is arranged in an are shape and is configured to engage within the hook groove, and the second end of the rotating shaft is rotatably connected to one side of the mounting base.

6. The chassis assembly of claim 5, wherein the rotating hook is coaxial with the rotating shaft and the rotating axis is arranged along the horizontal direction, a first connecting platform is convexly disposed on a circumferential surface of the rotating shaft facing the rotating hook, wherein the first end of the rotating hook is fixed on the first connecting platform, and the second end of the rotating hook spaced from the rotating shaft can engage within the hook groove.

7. The chassis assembly of claim 4, wherein the rotating hook is provided in a circular arc shape, a cross-sectional shape of the hook groove is a circular are matching with the rotating hook.

8. The chassis assembly of claim 6, wherein a tooth groove is diposed on the inner circumferential surface of the rotating hook facing the rotating shaft, wherein a tooth is arranged on the first connecting platform, and the tooth is engaged within the tooth groove.

9. The chassis assembly of claim 8, wherein a second connecting platform is convexly disposed on a circumferential surface of the rotating hook facing the rotating shaft, wherein the second connecting platform is connected to the first connecting platform of the rotating shaft, wherein a tooth groove is defined by the second connecting platform and the tooth on the first connecting platform is engaged within the tooth groove.

10. The chassis assembly of claim 5, wherein a width of the hook groove in the radial direction of the rotating hook is not less than a sum of a thickness of the rotating hook and a thickness of the mounting base.

11. The chassis assembly of claim 5, wherein the rotating assembly further comprises a linkage shaft, wherein two ends of the linkage shaft are connected to two adjacent rotating shafts with coincident rotation axes.

12. The chassis assembly of claim 5, the mounting base is provided in a plate shape, wherein a first end of the mounting base is integrally connected to the chassis, and a second end in an arc shape is flush with an end of the rotating hook, wherein the second end of the rotating shaft is rotatably connected to one side of the mounting base, in a condition that the battery module is locked in the preset mounting position, the lower surface of the mounting seat is attached to the upper surface of the bump.

13. The chassis assembly of claim 5, wherein the chassis assembly comprises a driving motor, the driving motor is connected to the rotating shaft, a pressure senor is arranged on a bottom surface of the mounting base, wherein in a condition that the pressure received by the pressure sensor exceeds a maximum preset pressure, the control system is set to automatically start the driving motor to drive the rotating hook to rotate to the lock position to engage the rotating hook within the hook groove to accomplish the locking of the battery module.

14. The chassis assembly of claim 1, wherein the voltage electrical connecting assembly comprises a high-voltage electrical connecting assembly, wherein the high-voltage electrical connecting assembly comprises: a first quick plug-in connector; anda high-voltage electrical connecting module arranged to be electrically connected to the battery module through the first quick plug-in connector; wherein the first quick plug-in connector is electrically connected to the control system, and the control system is configured to control the first quick plug-in connector, wherein the battery module is provided with a connecting flange, the connecting flange is provided with an insertion hole; andthe first quick plug-in connector includes: an inserting post, a first end of the inserting post passes through the insertion hole, wherein a cavity is defined by the inserting post, a through-hole communicating with the cavity is defined by an outer peripheral wall of the first end of the inserting post;an expanded elastomeric assembly, the expanded elastomeric assembly disposed in the through-hole, configured to partially protrude from the outer peripheral wall of the inserting post and pressing against a lower surface of the connecting flange;

anda limiting flange surrounding the outer peripheral wall of the inserting post, wherein a lower surface of the limiting flange presses against an upper surface of the connecting flange.

15. The chassis assembly of claim 14, wherein the expanded elastomeric assembly includes: an elastic seal sealing and arranged in the through-hole, and a steel ball contained in the through-hole and located outside the elastic seal, wherein the steel ball is configured to partially protrude from the outer peripheral wall of the inserting post in a condition that the first quick plug- in connector is inserted into the battery module, wherein a insertion column is provided with an oil delivery channel along a axial direction, the oil delivery channel is used to fill the cavity with high-pressure gas or hydraulic oil to increase a pressure in the cavity increases, so that the steel ball is pushed to move outward by the elastic seal to press against a lower surface of the connecting flange.

16. The chassis assembly of claim 15, wherein a diameter of the steel ball is larger than a diameter of an aperture of the unsealed end of the through-hole without an elastic seal.

17. The chassis assembly of claim 15, wherein a housing opening of the elastic seal is fixed onto one end of the through-hole communicating with the cavity through interference fit, and an accommodating space for the steel ball is defined between the housing opening of the elastic seal and the through-hole, wherein the steel ball can be movably assembled in the accommodating space.

18. The chassis assembly of claim 14, wherein at least two bumps are respectively arranged on both sides of the battery module, wherein the rotating hook corresponds to the bump, and a hook groove is disposed on the upper surface of the bumps, wherein the hook grooves extend to both sides of the bump along a rotation axis direction of the rotating hooks and are communicated with the two end surfaces of the bump.

19. The chassis assembly of claim 14, wherein a mounting base is configured on the chassis, the rotating assembly further comprises a rotating shaft, the rotating shaft is configured to rotate to drive the rotating hook to rotate, wherein a first end of the rotating hook is connected to a first end of the rotating shaft, and a second end of the rotating hook is arranged in an arc shape and is configured to engage within the hook groove, and the second end of the rotating shaft is rotatably connected to one side of the mounting base.

20. The chassis assembly of claim 19, wherein the rotating hook is coaxial with the rotating shaft and the rotating axis is arranged along the horizontal direction, a first connecting platform is convexly disposed on a circumferential surface of the rotating shaft facing the rotating hook, wherein the first end of the rotating hook is fixed on the first connecting platform, and the second end of the rotating hook spaced from the rotating shaft can engage within the hook groove.

* * * * *